(12) United States Patent
Jeong et al.

(10) Patent No.: US 12,736,847 B2
(45) Date of Patent: Sep. 15, 2026

(54) METHOD FOR MANUFACTURING MICRO-WRINKLE-STRUCTURED CHOLESTERIC LIQUID CRYSTAL FILM, MICRO-WRINKLE-STRUCTURED CHOLESTERIC LIQUID CRYSTAL FILM MANUFACTURED THEREBY, AND PHOTONIC CRYSTAL REFLECTIVE FILM INCLUDING SAME

(71) Applicant: INDUSTRIAL COOPERATION FOUNDATION JEONBUK NATIONAL UNIVERSITY, Jeollabuk-do (KR)

(72) Inventors: Kwang Un Jeong, Jeollabuk-do (KR); Dong-Gue Kang, Gyeonggi-do (KR); Seok-In Lim, Jeollabuk-do (KR); Seungchul Yang, Jeollabuk-do (KR); Mintaek Oh, Jeollabuk-do (KR); Hyeyoon Ko, Jeollabuk-do (KR); Minwoo Rim, Jeollabuk-do (KR)

(73) Assignee: INDUSTRIAL COOPERATION FOUNDATION JEONBUK NATIONAL UNIVERSITY, Jeollabuk-do (KR)

( * ) Notice: Subject to any disclaimer, the term of this patent is extended or adjusted under 35 U.S.C. 154(b) by 239 days.

(21) Appl. No.: 18/265,284

(22) PCT Filed: Jun. 28, 2021

(86) PCT No.: PCT/KR2021/008078
§ 371 (c)(1),
(2) Date: Nov. 16, 2023

(87) PCT Pub. No.: WO2022/119066
PCT Pub. Date: Jun. 9, 2022

(65) Prior Publication Data

US 2025/0271720 A1 Aug. 28, 2025

(30) Foreign Application Priority Data

Dec. 3, 2020 (KR) ........................ 10-2020-0167435

(51) Int. Cl.
*G02F 1/137* (2006.01)
*B29C 35/02* (2006.01)
(Continued)

(52) U.S. Cl.
CPC .......... *G02F 1/13718* (2013.01); *B29C 35/02* (2013.01); *B29C 55/04* (2013.01); *C08J 7/04* (2013.01)

(58) Field of Classification Search
CPC ..... G02F 1/13718; B29C 35/02; B29C 55/04; C08J 7/04
See application file for complete search history.

(56) References Cited

U.S. PATENT DOCUMENTS

2016/0233447 A1* 8/2016 Kim ..................... H10K 50/115
2019/0033634 A1* 1/2019 Katoh .................... H05B 33/04
(Continued)

FOREIGN PATENT DOCUMENTS

EP 1 045 260 A1 10/2000
KR 10-2012-0122434 A 11/2012
(Continued)

OTHER PUBLICATIONS

International Search Report for PCT/KR2021/008078 mailed on Mar. 8, 2022.

*Primary Examiner* — David Y Chung
(74) *Attorney, Agent, or Firm* — The PL Law Group, PLLC

(57) ABSTRACT

In a method for manufacturing a cholesteric liquid crystal film, an elastic polymer substrate is prepared by impregnating, on one or both sides of a first polymer film, a second polymer having a modulus different from that of the first
(Continued)

Preparation of elastic polymer substrate by coating, on one or both sides of first polymer film, second polymer having modulus different from that of first polymer — S10

Preparation of micro-wrinkle-structured substrate by stretching elastic polymer substrate in one direction and removing stretching force — S20

Preparation of micro-wrinkle-structured cholesteric liquid crystal film by transferring cholesteric liquid crystal monomer mixture onto one side of micro-wrinkle-structured substrate — S30 polymer, a micro-wrinkle-structured substrate is prepared by stretching the elastic polymer substrate in one direction and removing the stretching force, and a micro-wrinkle-structured cholesteric liquid crystal film is prepared by transferring a cholesteric liquid crystal monomer mixture onto one side of the micro-wrinkle-structured substrate. The cholesteric liquid crystal film manufactured is induced to have a micro-wrinkled structure and, thus, has the advantage of appearing as the same color even when observed at various angles.

12 Claims, 6 Drawing Sheets

(51) Int. Cl.

| | |
|---|---|
| ***B29C 55/04*** | (2006.01) |
| ***C08J 7/04*** | (2020.01) |

(56) References Cited

U.S. PATENT DOCUMENTS

| | | | | |
|---|---|---|---|---|
| 2020/0183214 | A1* | 6/2020 | Katoh | C09K 19/56 |
| 2020/0225387 | A1* | 7/2020 | Ishiguro | C08F 20/30 |
| 2021/0223445 | A1* | 7/2021 | Ishiguro | G02B 5/0284 |
| 2022/0009275 | A1* | 1/2022 | Kaneiwa | B44F 1/02 |
| 2022/0011618 | A1* | 1/2022 | Saneto | G02B 5/3016 |
| 2023/0258993 | A1* | 8/2023 | Oi | G02F 1/13768<br>349/23 |
| 2023/0288744 | A1* | 9/2023 | Oi | G02F 1/133368 |

FOREIGN PATENT DOCUMENTS

| | | |
|---|---|---|
| KR | 10-2015-0009220 A | 1/2015 |
| KR | 10-2017-0088195 A | 8/2017 |

* cited by examiner

Flat glass substrate

Wrinkled IPN substrate

METHOD FOR MANUFACTURING MICRO-WRINKLE-STRUCTURED CHOLESTERIC LIQUID CRYSTAL FILM, MICRO-WRINKLE-STRUCTURED CHOLESTERIC LIQUID CRYSTAL FILM MANUFACTURED THEREBY, AND PHOTONIC CRYSTAL REFLECTIVE FILM INCLUDING SAME

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/008078, filed Jun. 28, 2021, which claims priority to the benefit of Korean Patent Application No. 10-2020-0167435 filed in the Korean Intellectual Property Office on Dec. 3, 2020, the entire contents of which are incorporated herein by reference.

BACKGROUND

1. Technical Field

The present disclosure relates to a method for manufacturing a micro-wrinkle-structured cholesteric liquid crystal film, a micro-wrinkle-structured cholesteric liquid crystal film manufactured thereby, and a photonic crystal reflective film including the same.

2. Background Art

Micro- to nano-sized wrinkles can impart useful properties to a substrate surface and are widely used in the fields of biotechnology, electricity, electronics and optical films. Wrinkles on the surface can provide an additional area that can accommodate external physical actions such as stretching, release and bending using the elasticity of the substrate, thus allowing the substrate to serve as a flexible substrate.

There are several methods for inducing wrinkles on the substrate surface, such as formation of a wrinkle pattern using pores, formation of a wrinkle pattern through self-assembly, etc. But, there are problems in stability, the spacing and height between wrinkles, and the completeness of regular arrangement. The methods for preparing a one-dimensional photonic crystal film without wrinkles use colloids, block copolymers, cholesteric liquid crystals, etc. However, there is a problem that the dependence on viewing angle is very large because the reflected wavelength varies depending on the angle.

Meanwhile, there are various methods for forming a micro-wrinkled structure on a surface. Among them, there is a method of using a periodic semicircular micro-grooved (PSMG) substrate to create a large-area, large-volume surface wrinkle film by making a wrinkled polymer template substrate. In this method, an alloy plate mold is prepared by rolling an alloy plate with a metal wire and embossing the same, and a template substrate considering various physical properties can be fabricated several times from one mold. However, since the alloy plate and the metal wire are affected by the heat applied during the embossing process, the alloy and metal wire used are limited. If the embossing temperature is high enough, the size of the wrinkles of the mold is limited to a micrometer level due to thermal expansion of the metal wire and alloy plate. As a result, it may be difficult to precisely control the cholesteric liquid crystal.

Another method is a method of forming wrinkles in a double layer made by adjusting temperature using the difference in the order parameters of the two layers. In the double layer formed from polymerization of liquid crystal mesogens whose order parameters vary depending on temperature, vertical or horizontal wrinkles may be formed by heating or cooling in a range of 30-60° C. and they can be controlled reversibly. However, the materials that can be used are limited because the uniformity of the liquid crystal phase and the temperature range in which the liquid crystal phase is exhibited should be similar to the temperature range that can be applied.

SUMMARY

The present disclosure is directed to providing a method for manufacturing a micro-wrinkle-structured cholesteric liquid crystal film, and a micro-wrinkle-structured cholesteric liquid crystal film manufactured thereby.

The present disclosure provides a method for manufacturing a micro-wrinkle-structured cholesteric liquid crystal film. In an exemplary embodiment, a method for manufacturing the cholesteric liquid crystal film includes: a step of preparing an elastic polymer substrate by impregnating, on one or both sides of a first polymer film, a second polymer having a modulus different from that of the first polymer; a step of preparing a micro-wrinkle-structured substrate by stretching the elastic polymer substrate in one direction and removing the stretching force; and a step of preparing a micro-wrinkle-structured cholesteric liquid crystal film by transferring a cholesteric liquid crystal monomer mixture onto one side of the micro-wrinkle-structured substrate.

In a specific exemplary embodiment, the step of preparing the elastic polymer substrate may include a process of preparing a mixture solution by mixing the second polymer and a curing agent in an organic solvent, and a process of infiltrating the second polymer into both sides of the first polymer film by impregnating the first polymer film in the mixture solution.

Each of the first and second polymers includes one or more selected from a silicone resin, a urethane resin, an isoprene resin, a fluorine resin, styrene-butadiene rubber, chloroprene rubber, an acrylonitrile copolymer and acrylate rubber. In a specific exemplary embodiment, the modulus of the first polymer is in the range of 0.5-0.7 MPa on average, and the modulus of the second polymer is in the range of 1.5-3.0 MPa on average.

In another exemplary embodiment, the step of preparing the micro-wrinkle-structured substrate may include: a process of stretching the elastic polymer substrate at 20-40° C. in one direction with a strain of 50-200% on average; a process of thermally curing the stretched elastic polymer substrate at 70-150° C. on average; and a process of forming micro-wrinkles on the elastic polymer substrate by removing the stretching force from the thermally cured polymer substrate.

In the process of thermally curing, an interpenetrating polymer network (IPN) structure in which the second polymer is bound to the contact surface of the first polymer film may be formed.

The step of preparing the micro-wrinkle-structured cholesteric liquid crystal film may include: a process of coating a cholesteric liquid crystal monomer mixture containing first and second nematic liquid crystal monomers with different phase transition temperatures and a chiral monomer on the micro-wrinkle-structured substrate; and a process of preparing a cholesteric liquid crystal film by conducting photocrosslinking reaction of the liquid crystal monomer mixture. In a specific exemplary embodiment, the first and second nematic liquid crystal monomers and the chiral monomer may be mixed at a weight ratio of 9-7:1-3.

The first and second nematic liquid crystal monomers may have phase transition temperatures of 20-80° C.

In addition, each of the first and second nematic liquid crystal monomers independently includes a rod-shaped core having a structure of any of Chemical Formulas 1-20, wherein each of A and B independently contains an alkyl group with two or more carbon atoms and a methacrylate or acrylate group:

[Chemical Formula 1]

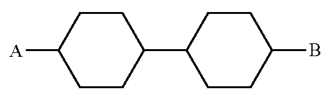

[Chemical Formula 2]

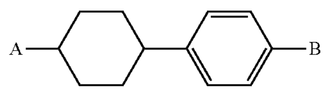

[Chemical Formula 3]

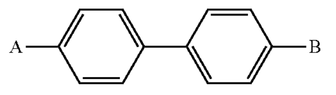

[Chemical Formula 4]

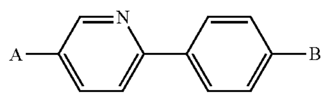

[Chemical Formula 5]

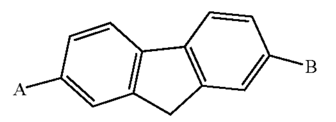

[Chemical Formula 6]

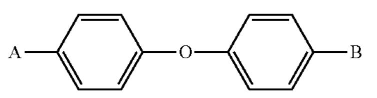

[Chemical Formula 7]

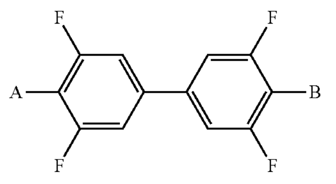

[Chemical Formula 8]

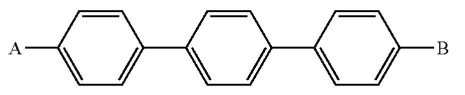

[Chemical Formula 9]

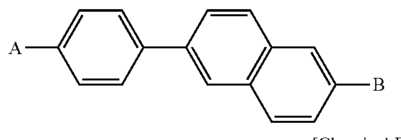

[Chemical Formula 10]

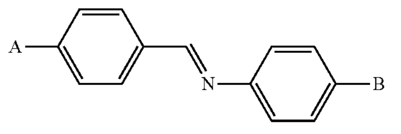

-continued

[Chemical Formula 11]

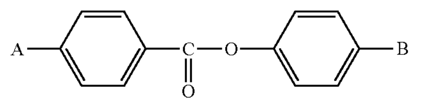

[Chemical Formula 12]

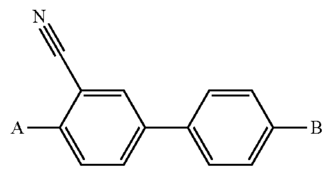

[Chemical Formula 13]

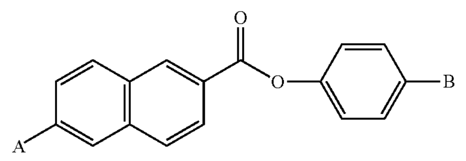

[Chemical Formula 14]

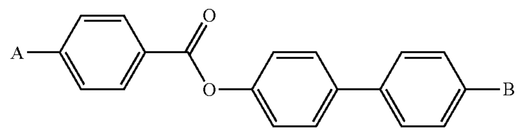

[Chemical Formula 15]

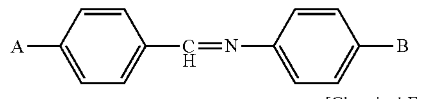

[Chemical Formula 16]

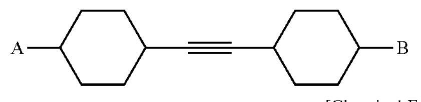

[Chemical Formula 17]

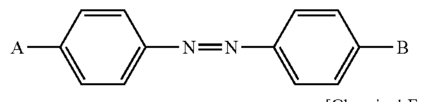

[Chemical Formula 18]

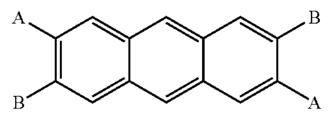

[Chemical Formula 19]

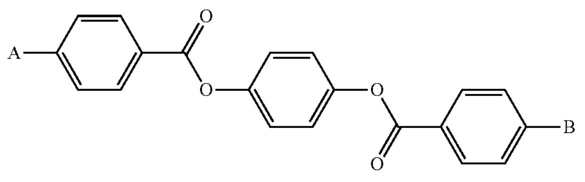

[Chemical Formula 20]

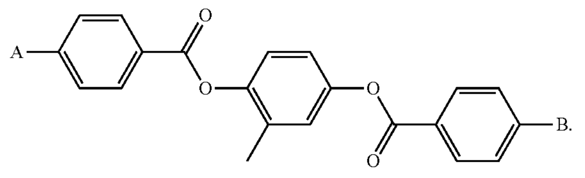

In Chemical Formulas 1-20, each of A and B may independently be selected from structures of Chemical Formulas 21-26:

[Chemical Formula 21]

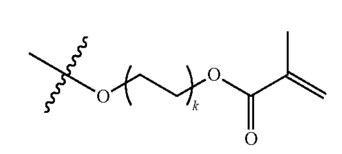

[Chemical Formula 22]

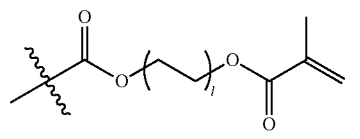

[Chemical Formula 23]

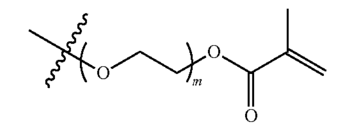

[Chemical Formula 24]

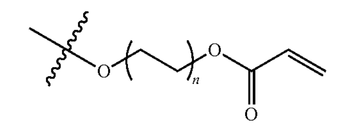

[Chemical Formula 25]

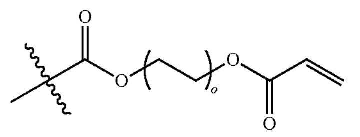

[Chemical Formula 26]

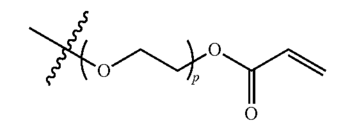

In Chemical Formulas 21-26, each of k, l, m, n, o and p is independently an integer of 1-20.

In another exemplary embodiment, the method for manufacturing a cholesteric liquid crystal film according to the present disclosure further includes a step of separating the micro-wrinkle-structured cholesteric liquid crystal film from the micro-wrinkle-structured substrate.

The present disclosure also provides a cholesteric liquid crystal film manufactured by the method for manufacturing a cholesteric liquid crystal film. In a specific exemplary embodiment, the cholesteric liquid crystal film contains a cholesteric liquid crystal (CLC) consisting of a nematic liquid crystal and a chiral dopant and has a curved structure wherein peaks and valleys are formed alternately along one direction, wherein the width (W) of the peaks or valleys of the curved structure is 40-200 μm on average.

The cholesteric liquid crystal film may have a reflected wavelength of 550 nm on average at a viewing angle of 0° and may have a reflected wavelength of 540-560 nm on average at a viewing angle of 60°.

The present disclosure also provides a photonic crystal reflective film including the cholesteric liquid crystal film. The photonic crystal reflective film may be a viewing angle-independent photonic crystal reflective film.

A method for manufacturing a micro-wrinkle-structured cholesteric liquid crystal film, a micro-wrinkle-structured cholesteric liquid crystal film manufactured thereby, and a photonic crystal reflective film including the same according to the present disclosure are advantageous in that the cholesteric liquid crystal film is induced to have a micro-wrinkle structure and, thus, appears as the same color even when observed at various angles.

DETAILED DESCRIPTION

Figure 1:
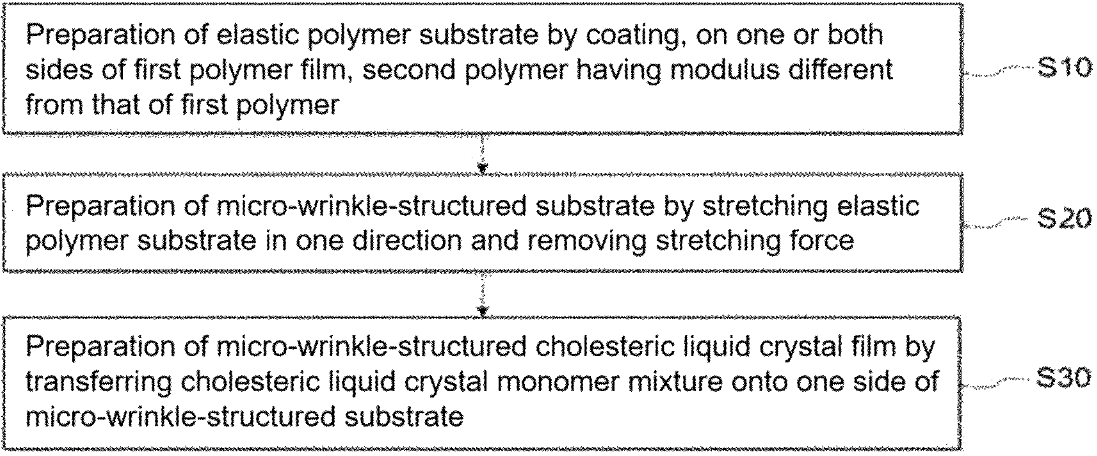
FIG. 1 is a flowchart of a method for manufacturing a cholesteric liquid crystal film according to the present disclosure.

The present disclosure may be changed variously and may have various exemplary embodiments. Specific exemplary embodiments are illustrated in drawings and are described in detail.

However, it is not intended to limit the present disclosure to specific exemplary embodiments, and it should be understood that all changes, equivalents and substitutes encompassed in the spirit and scope of the present disclosure are included. In describing the present disclosure, if it is determined that a detailed description of a related known technology may obscure the gist of the present disclosure, the detailed description will be omitted.

The terms used in this application are used only to describe specific exemplary embodiments and are not intended to limit the present disclosure. Singular expressions include plural expressions unless the context clearly indicates otherwise.

In the present disclosure, the terms such as “include”, “have”, etc. are intended to designate that a feature, number, step, operation, component, part or a combination thereof described in the specification exists, but should not be understood as precluding the possibility of the existence or addition of one or more other features, numbers, steps, operations, components, parts or combinations thereof.

The present disclosure relates to a method for manufacturing a micro-wrinkle-structured cholesteric liquid crystal film, a micro-wrinkle-structured cholesteric liquid crystal film manufactured thereby, and a photonic crystal reflective film including the same.

In general, micro-sized wrinkles can impart useful properties to a substrate surface and are widely used in the fields of biotechnology, electricity, electronics and optical films. Wrinkles on the surface can provide an additional area that can accommodate external physical actions such as stretching, release and bending using the elasticity of the substrate, thus allowing the substrate to serve as a flexible substrate.

There are several methods for inducing wrinkles on the substrate surface, such as formation of a wrinkle pattern using buckling or pores, formation of a wrinkle pattern through self-assembly, etc. But, there are problems in stability, the spacing and height between wrinkles, and the completeness of regular arrangement. The methods for preparing a one-dimensional photonic crystal film without wrinkles use colloids, block copolymers, cholesteric liquid crystals, etc. However, there is a problem that the dependence on viewing angle is very large because the reflected wavelength varies depending on the angle.

Therefore, the inventors of the present disclosure have introduced an elastic polymer substrate with an interpenetrating polymer network structure using elastic rubber without using a relatively hard glass or metal substrate. In addition, they have invented a method for manufacturing a micro-wrinkle-structured cholesteric liquid crystal film by forming a micro-wrinkled structure on the elastic polymer substrate and then shear-coating and curing cholesteric liquid crystal monomers on the micro-wrinkle-structured substrate.

The cholesteric liquid crystal film has the advantage that the same color appears regardless of viewing angles due to the micro-wrinkled structure.

Hereinafter, the present disclosure is described in more detail.

Method for Manufacturing Cholesteric Liquid Crystal Film

FIG. 1 is a flowchart of a method for manufacturing a cholesteric liquid crystal film according to the present disclosure.

Referring to FIG. 1, in an exemplary embodiment, the present disclosure provides a method for manufacturing the cholesteric liquid crystal film, which includes: a step of preparing an elastic polymer substrate by impregnating, on one or both sides of a first polymer film, a second polymer having a modulus different from that of the first polymer (S10); a step of preparing a micro-wrinkle-structured substrate by stretching the elastic polymer substrate in one direction and removing the stretching force (S20); and a step of preparing a micro-wrinkle-structured cholesteric liquid crystal film by transferring a cholesteric liquid crystal monomer mixture onto one side of the micro-wrinkle-structured substrate (S30).

According to the method for manufacturing a cholesteric liquid crystal film according to the present disclosure, a film with a wide viewing angle and a decreased angle dependence of reflected wavelength can be manufactured by forming a micro-wrinkled structure on the surface of an elastic polymer substrate with an interpenetrating polymer network structure formed using two types of polymers, shear-coating a cholesteric liquid crystal monomer mixture, stabilizing a cholesteric liquid crystal layer through photopolymerization and then transferring the micro-wrinkled structure.

In particular, the cholesteric liquid crystal film has the advantage that the same color appears regardless of viewing angles due to the micro-wrinkled structure.

Figure 2:
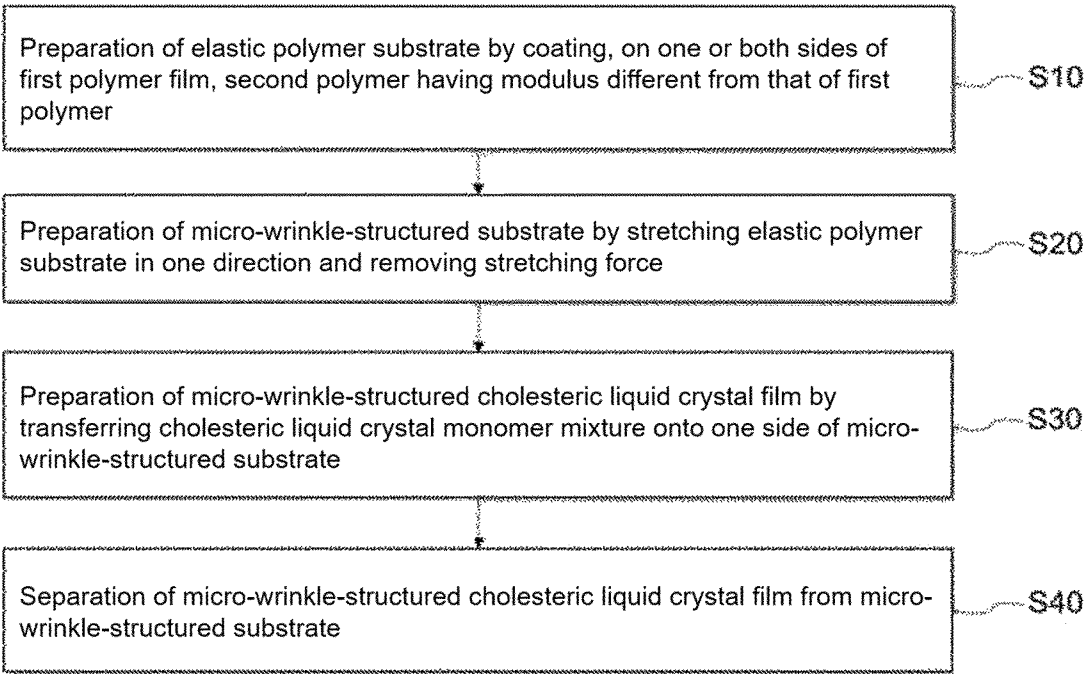
FIG. 2 is a flowchart of a method for manufacturing a cholesteric liquid crystal film according to the present disclosure.
Figure 3:
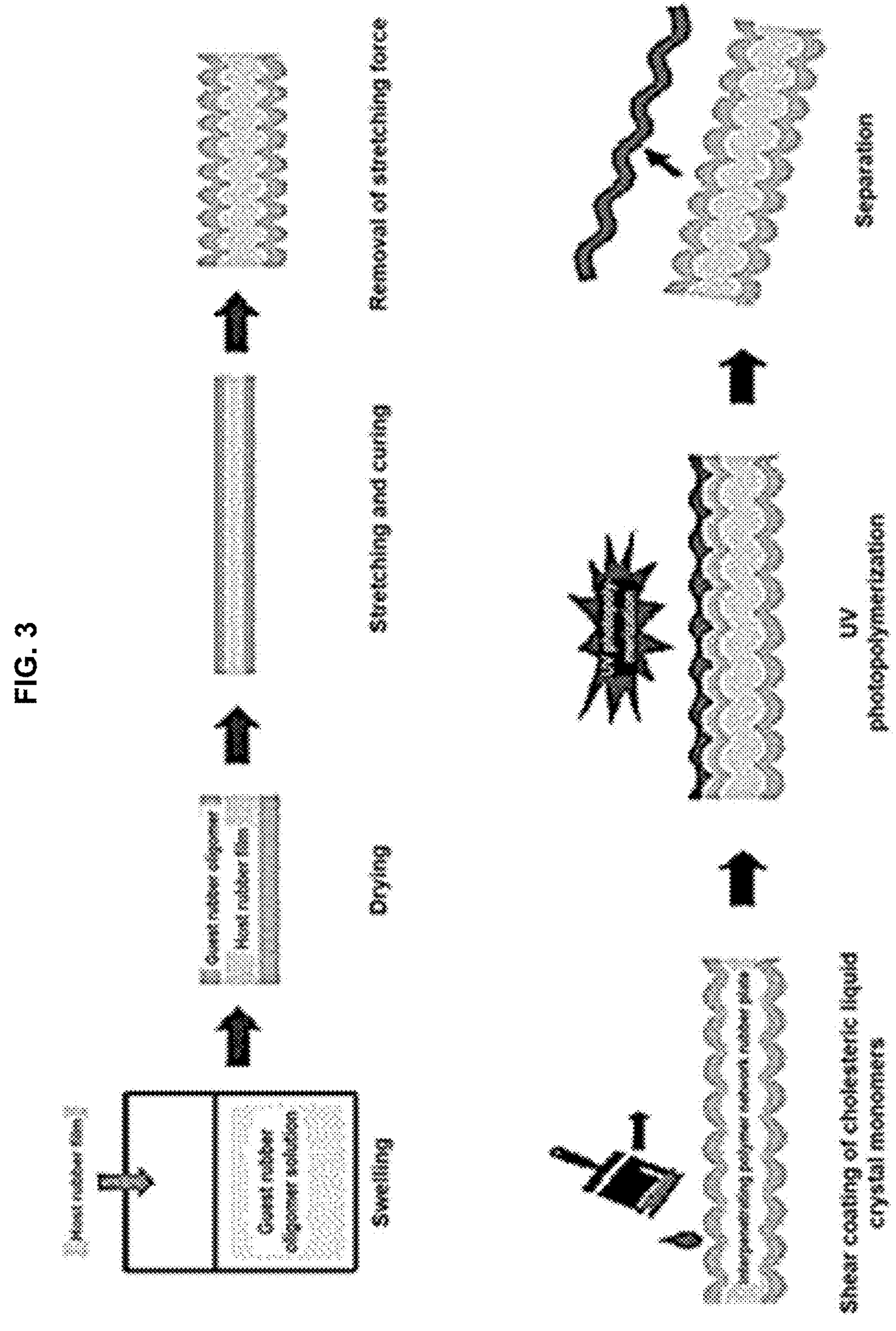
FIG. 3 schematically describes a method for manufacturing a cholesteric liquid crystal film according to the present disclosure.

FIG. 2 is a flowchart of the method for manufacturing a cholesteric liquid crystal film according to the present disclosure and FIG. 3 schematically describes the method for manufacturing a cholesteric liquid crystal film according to the present disclosure.

Hereinafter, each step of the method for manufacturing a cholesteric liquid crystal film according to the present disclosure will be described in detail referring to FIG. 2 and FIG. 3.

The method for manufacturing a cholesteric liquid crystal film according to the present disclosure includes: a step of preparing an elastic polymer substrate by impregnating, on one or both sides of a first polymer film, a second polymer having a modulus different from that of the first polymer (S10); a step of preparing a micro-wrinkle-structured substrate by stretching the elastic polymer substrate in one direction and removing the stretching force (S20); a step of preparing a micro-wrinkle-structured cholesteric liquid crystal film by transferring a cholesteric liquid crystal monomer mixture onto one side of the micro-wrinkle-structured substrate (S30); and a step of separating the micro-wrinkle-structured cholesteric liquid crystal film from the micro-wrinkle-structured substrate (S40).

Preparation of Elastic Polymer Substrate (S10)

The method for manufacturing a cholesteric liquid crystal film according to the present disclosure includes a step of preparing an elastic polymer substrate by impregnating, on one or both sides of a first polymer film, a second polymer having a modulus different from that of the first polymer (S10).

More specifically, the step of preparing the elastic polymer substrate (S10) include a process of preparing a mixture solution by mixing the second polymer and a curing agent in an organic solvent (S11), and a process of infiltrating the second polymer into both sides of the first polymer film by impregnating the first polymer film in the mixture solution (S12).

In an exemplary embodiment, the first polymer and the second polymer have different moduli, and the difference in the moduli of the first polymer and the second polymer may determine the size of the micro-wrinkled structure. Each of the first and second polymers may be one or more selected from a silicone resin, a urethane resin, an isoprene resin, a fluorine resin, styrene-butadiene rubber, chloroprene rubber, an acrylonitrile copolymer and acrylate rubber. The first and second polymers may be different type of polymers. In another exemplary embodiment, the first and second polymers may be the same type of polymers. But, the first and second polymers should have different modulus values.

In a specific exemplary embodiment, the modulus of the first polymer may be 0.5-0.7 MPa on average, and the modulus of the second polymer may be 1.5-3.0 MPa on average.

As described above, the first polymer and the second polymer have different moduli and, as a result, a micro-wrinkled structure prepared therefrom can exhibit difference in domain size and physical stability.

Meanwhile, the organic solvent may be a hydrocarbon solvent selected from a group consisting of hexane, heptane, xylene, toluene and cyclohexane. For example, heptane may be used as the organic solvent.

The curing agent exhibits adhesive property by forming a crosslinked structure and may be any curing agent used in the art without special limitation. The curing agent may be a curing agent which is in liquid state at room temperature. For example, the second polymer may be Sylgard 184, which is a PDMS, and Sylgard 184A, which is a main agent, may be cured by mixing with Sylgard 184B, which is a curing agent. Meanwhile, Karstedt's catalyst, which is an organoplatinum compound, may be used as a catalyst.

The amount of the thermal curing agent may be 1-20 parts by weight based on 100 parts by weight of the first and second polymers. Specifically, the amount of the thermal curing agent may be 1-20 parts by weight, 2-10 parts by weight, 3-8 parts by weight or 5 parts by weight, based on 100 parts by weight of the first and second polymers.

In the step of preparing the elastic polymer substrate (S10), a first polymer layer may be formed on both sides of the first polymer film. Subsequently, a process of infiltrating the second polymer into both sides of the first polymer film and then drying the same may be further included.

Preparation of Micro-Wrinkle-Structured Substrate (S20)

The method for manufacturing a cholesteric liquid crystal film according to the present disclosure includes a step of preparing a micro-wrinkle-structured substrate by stretching the elastic polymer substrate in one direction and removing the stretching force (S20).

In a specific exemplary embodiment, the step of preparing the micro-wrinkle-structured substrate includes: a process of stretching the elastic polymer substrate at 20-40° C. in one direction with a strain of 50-200% on average; a process of thermally curing the stretched elastic polymer substrate at 70-150° C. on average; and a process of forming micro-wrinkles on the elastic polymer substrate by removing the stretching force from the thermally cured polymer substrate.

In the process of thermally curing, an interpenetrating polymer network (IPN) structure in which the second polymer is bound to the contact surface of the first polymer film may be formed.

More specifically, after impregnating the first polymer film having elasticity in the organic solvent wherein the second polymer and the curing agent are mixed, followed by drying, thermal curing is performed while applying stretching force. In this case, an interpenetrating polymer network structure may be formed as the oligomers of the second polymer are inserted between the surface network of the first polymer film. Then, when the stretching force is removed, a micro-wrinkled structure is formed on the surface of the elastic polymer substrate due to the difference in moduli. As a result, a micro-wrinkle-structured substrate can be prepared.

The micro-wrinkle-structured substrate is for inducing the micro-wrinkled structure of a cholesteric liquid crystal film as will be described later.

Preparation of Cholesteric Liquid Crystal Film (S30)

The method for manufacturing a cholesteric liquid crystal film according to the present disclosure includes a step of preparing a micro-wrinkle-structured cholesteric liquid crystal film by transferring a cholesteric liquid crystal monomer mixture onto one side of the micro-wrinkle-structured substrate (S30)

In a specific exemplary embodiment, the step of preparing the micro-wrinkle-structured cholesteric liquid crystal film includes a process of coating a cholesteric liquid crystal monomer mixture containing first and second nematic liquid crystal monomers with different phase transition temperatures and a chiral monomer on the micro-wrinkle-structured substrate; and a process of preparing a cholesteric liquid crystal film by conducting photocrosslinking reaction of the liquid crystal monomer mixture. More specifically, according to the present disclosure, the two nematic liquid crystal monomers having different phase transition temperatures are mixed with the chiral dopants at an optimal ratio on the micro-wrinkle-structured substrate for effective and uniform shear coating at room temperature. As a result, a micro-wrinkled structure may be formed easily on the cholesteric liquid crystal film without defects.

In addition, by mixing two nematic liquid crystal monomers with different phase transition temperatures, the phase transition temperature region from crystal to the nematic phase may be lowered to 20-80° C. and, thus, uniform coating can be achieved effectively at room temperature on the substrate. Furthermore, by using the liquid crystals and chiral dopants that can be photopolymerized, a stable cholesteric liquid crystal layer can be formed through polymerization after the coating. That is to say, the phase transition temperature of the cholesteric liquid crystal monomer mixture including the first and second nematic liquid crystal monomers may be 20-80° C.

The first and second nematic liquid crystal monomers and the chiral monomer may be mixed at a weight ratio of 9-7:1-3.

In an exemplary embodiment, each of the first and second nematic liquid crystal monomers may independently include a rod-shaped core having a structure of any of Chemical Formulas 1-20, wherein each of A and B may independently contain an alkyl group with two or more carbon atoms and a methacrylate or acrylate group:

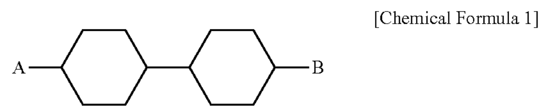

[Chemical Formula 1]

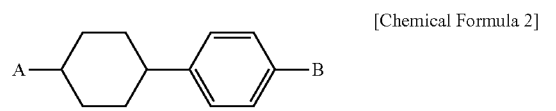

[Chemical Formula 2]

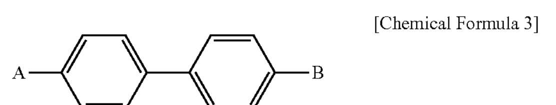

[Chemical Formula 3]

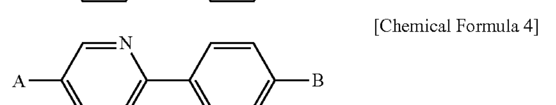

[Chemical Formula 4]

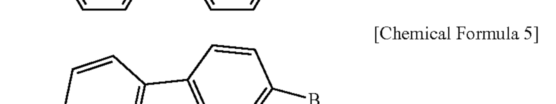

[Chemical Formula 5]

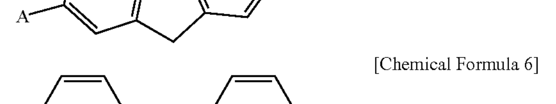

[Chemical Formula 6]

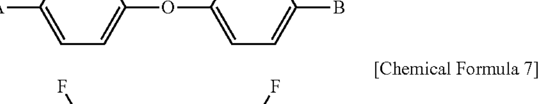

[Chemical Formula 7]

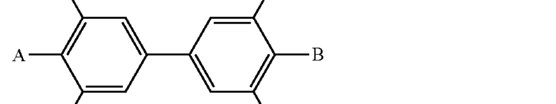

[Chemical Formula 8]

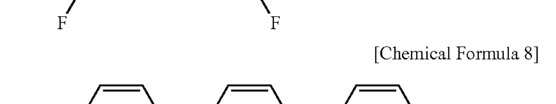

[Chemical Formula 9]

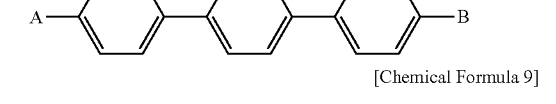

[Chemical Formula 10]

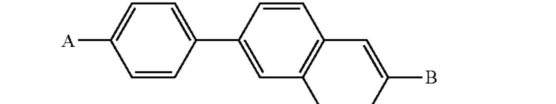

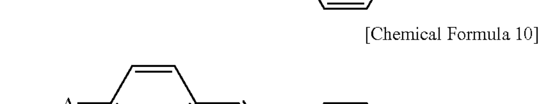

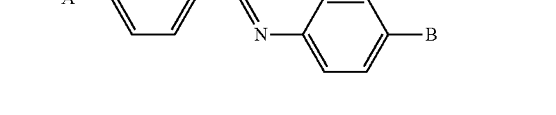

-continued

[Chemical Formula 11]

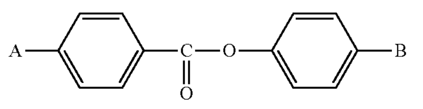

[Chemical Formula 12]

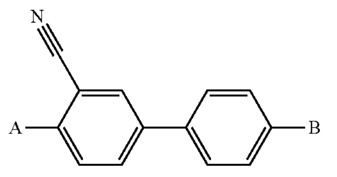

[Chemical Formula 13]

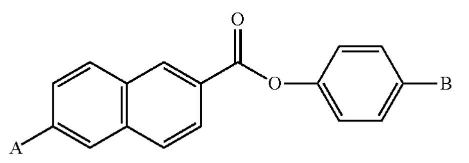

[Chemical Formula 14]

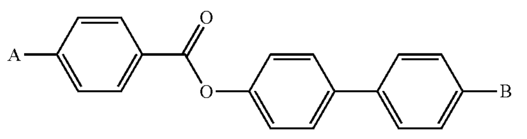

[Chemical Formula 15]

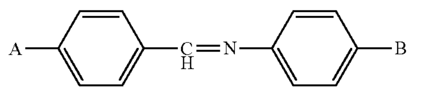

[Chemical Formula 16]

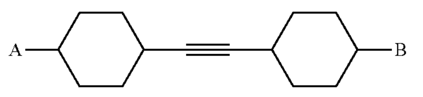

[Chemical Formula 17]

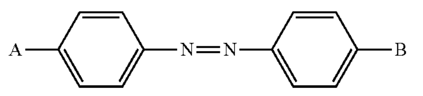

[Chemical Formula 18]

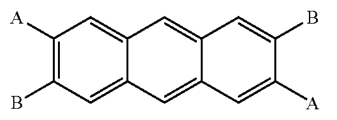

[Chemical Formula 19]

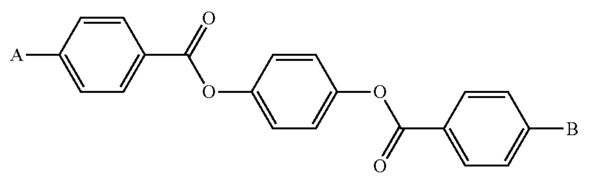

[Chemical Formula 20]

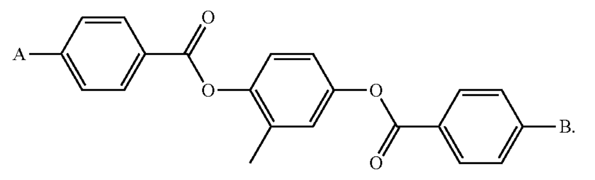

In Chemical Formulas 1-20, each of A and B may independently be selected from structures of Chemical Formulas 21-26:

[Chemical Formula 21]

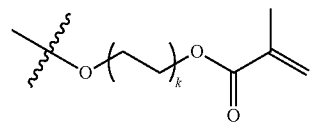

[Chemical Formula 22]

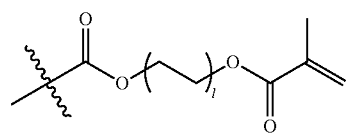

[Chemical Formula 23]

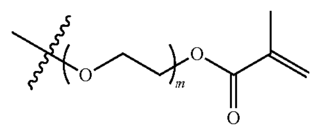

[Chemical Formula 24]

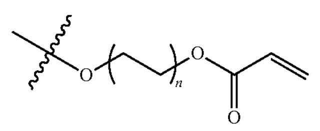

[Chemical Formula 25]

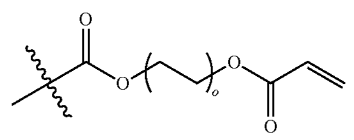

[Chemical Formula 26]

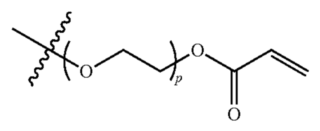

In Chemical Formulas 21-26, each of k, l, m, n, o and p is independently an integer of 1-20.

The chiral monomer includes all molecules having a chiral structure in the molecule including a polymerizable group. It may or may not exhibit a liquid crystal phase.

Separation of Micro-Wrinkle-Structured Cholesteric Liquid Crystal Film from Micro-Wrinkle-Structured Substrate (S40)

The method for manufacturing a cholesteric liquid crystal film further includes a step of separating the micro-wrinkle-structured cholesteric liquid crystal film from the micro-wrinkle-structured substrate (S40).

In a specific exemplary embodiment, a stable cholesteric liquid crystal film is formed on the elastic micro-wrinkle-structured substrate having a micro-wrinkled structure through polymerization, and a micro-wrinkled structure with a size of several micrometers to tens of micrometers is formed in the cholesteric liquid crystal layer when the cholesteric liquid crystal film is separated. Due to the multi-dimensional surface structure prepared through this relatively simple process, a photonic crystal film appearing as the same color even when observed at various angles can be fabricated because the same wavelength can be reflected. In addition, an angle-independent photonic crystal film capable of exhibiting various colors can be embodied by adjusting the pitch between cholesteric liquid crystals.

Cholesteric Liquid Crystal Film

The present disclosure provides a cholesteric liquid crystal film manufactured by the method for manufacturing a cholesteric liquid crystal film described in detail above.

The cholesteric liquid crystal is in the limelight as a display material because it can express excellent colors due to its good color reproducibility, variability and selective reflection characteristics. The cholesteric liquid crystal enables the shutter function of turning on/off light because light transmission and scattering can be controlled with the applied voltage. In addition, unlike the existing PDLCs, it is advantageous in that transmission and scattering modes can be operated without additional power consumption because voltage is applied only during the switching of modes (transmission and scattering modes) and the state is maintained even after the voltage is removed. Furthermore, since the repetition cycle of the curved structure, i.e., the pitch, can be adjusted with a relatively lower voltage, it is possible to selectively control the reflection of light in the visible region and, therefore, various colors can be displayed with a single composition or the light transmittance of a sunroof window can be adjusted freely.

In an exemplary embodiment, the cholesteric liquid crystal film contains a cholesteric liquid crystal (CLC) consisting of a nematic liquid crystal and a chiral dopant and has a curved structure wherein peaks and valleys are formed alternately along one direction. The width (W) of the peaks or valleys of the curved structure may be 40-200 μm on average.

The cholesteric liquid crystal film may have a reflected wavelength of 550 nm on average at a viewing angle of 0° and may have a reflected wavelength of 540-560 nm on average at a viewing angle of 60°.

Figure 4:
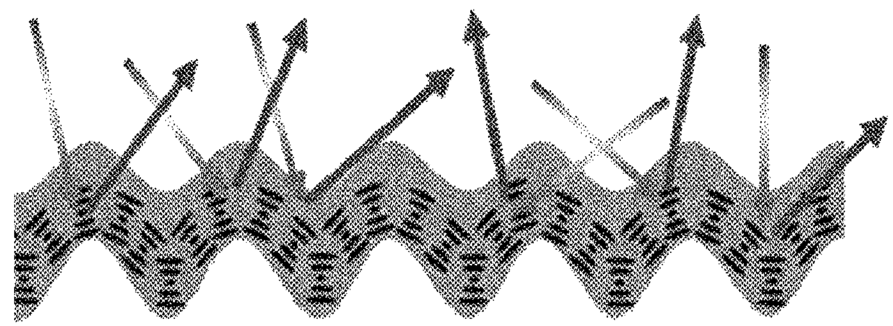
FIG. 4 schematically shows the principle of a reflected wavelength of a cholesteric liquid crystal film according to the present disclosure.

FIG. 4 schematically shows the principle of the reflected wavelength of the cholesteric liquid crystal film according to the present disclosure.

Referring to FIG. 4, the cholesteric liquid crystal layer is oriented horizontally along the micro-wrinkled structure and the color of a specific wavelength reflected by the cholesteric liquid crystal can be displayed even when observed from various angles. Accordingly, a photonic crystal film capable of exhibiting a specific color independently of viewing angles can be manufactured through the present disclosure.

A multi-dimensional photonic crystal film produced using the photonic crystal film made from the micro-wrinkled-structured cholesteric liquid crystal material according to the present disclosure can be applied to various industrial fields such as the military industry, smart materials, exterior materials, etc.

Hereinafter, the present disclosure will be described in more detail through an example and a test example.

However, the following example and test example merely illustrate the present disclosure, and the contents of the present disclosure are not limited by the example and test example.

EXAMPLE

Preparation of Micro-Wrinkle-Structured Substrate

A first polymer film containing an acrylate rubber-based polymer was prepared. A silicone resin was prepared as a guest second polymer having a network structure. The second polymer used in the example was a mixture of Chemical Formula 27 and Chemical Formula 28 in heptane (Chemical Formula 29) as an organic solvent. Specifically, Sylgard 184A of Chemical Formula 1, which is a main agent, and Sylgard 184B of Chemical Formula 2, which is a curing agent, were mixed in the organic solvent and then cured. In addition, Karstedt's catalyst, which is an organoplatinum compound, was also used. The weight ratio of Chemical Formula 27, Chemical Formula 28 and the organic solvent was 10:1:10.

[Chemical Formula 27]

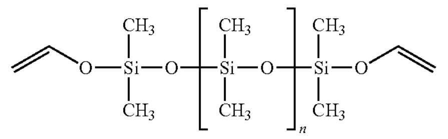

[Chemical Formula 28]

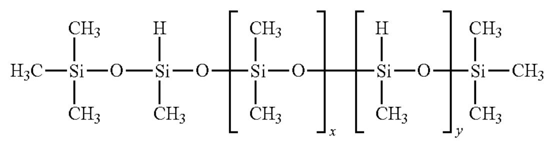

[Chemical Formula 29]

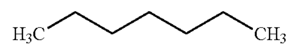

The second polymer was infiltrated into the surface of the elastic first polymer film by impregnating the first polymer film in the mixture solution. Then, an elastic polymer substrate was prepared by drying the elastic rubber film with a second polymer layer formed.

Then, after stretching the elastic polymer substrate with a strain of 50%, 100% or 150% on average, the substrate was thermally cured at 100° C. After the thermal curing, a micro-wrinkle-structured substrate was obtained by removing the stretching force from the substrate. The substrates prepared with the different strains are shown in FIGS. 5A to 5C.

Figures 5A, 5B, 5C:
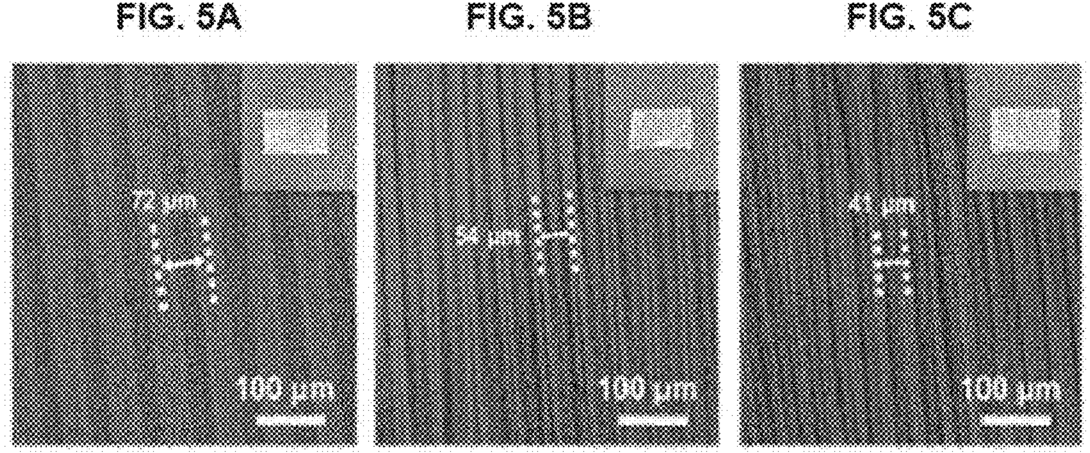
FIGS. 5A to 5C show the difference in the curved structure of a substrate depending on strain ((FIG. 5A) 50% strain, (FIG. 5B) 100% strain, (FIG. 5C) 150% strain).

FIGS. 5A to 5C show the difference in the curved structure of the substrate depending on strain ((FIG. 5A) 50% strain, (FIG. 5B) 100% strain, (FIG. 5C) 150% strain).

Preparation of Cholesteric Liquid Crystal Film

A cholesteric liquid crystal film was prepared using the micro-wrinkle-structured substrate. More specifically, a cholesteric liquid crystal monomer mixture was coated on one side of the micro-wrinkle substrate. The cholesteric liquid crystal monomer mixture consisted of two nematic liquid crystal monomers with different phase transition temperatures and chiral monomer. The nematic liquid crystal monomers used in this example were RM257 of Chemical Formula 30 and LC242 of Chemical Formula 31, and the chiral monomer was cRM of Chemical Formula 32. The nematic liquid crystal monomers of Chemical Formulas 30 and 31 and the chiral monomer of Chemical Formula 32 were mixed at a weight ratio of 45:45:9.9.

In addition, 0.1 part by weight of a photoinitiator of Chemical Formula 33 (DMPA) was mixed with the 100 parts by weight of the cholesteric liquid crystal monomer mixture for photocrosslinking.

[Chemical Formula 30]

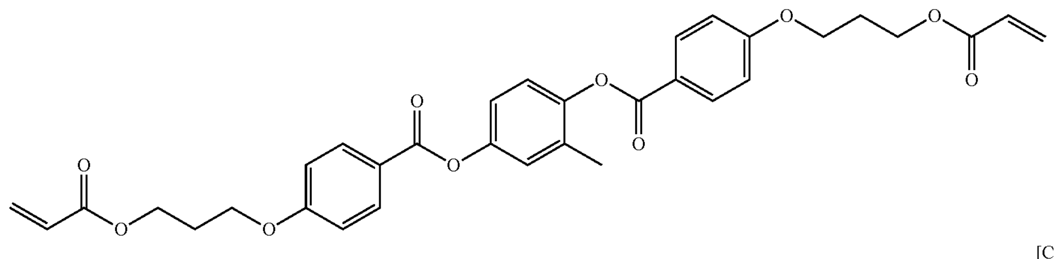

[Chemical Formula 31]

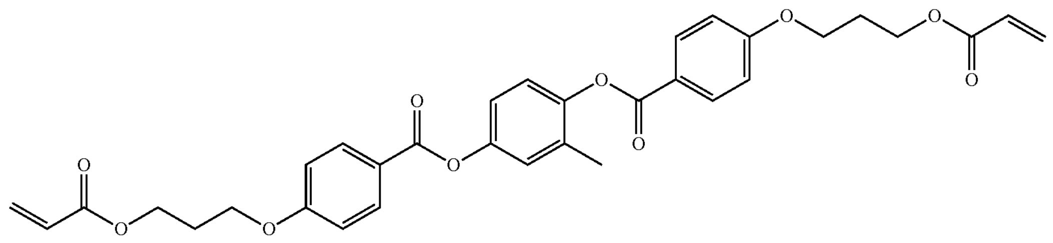

[Chemical Formula 32]

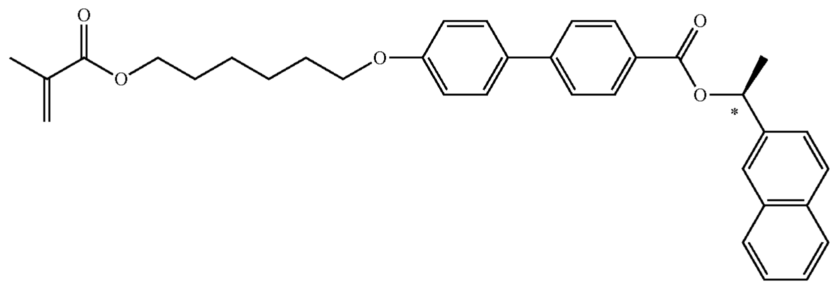

[Chemical Formula 33]

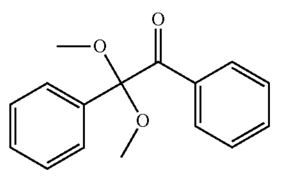

After the cholesteric liquid crystal monomer mixture was coated on the micro-wrinkle substrate, a film was prepared by conducting photopolymerization. Then, a cholesteric liquid crystal film was obtained by separating the film from the micro-wrinkle substrate.

The cholesteric liquid crystal film prepared in this example was arranged stably along the micro-wrinkled structure and exhibited the color of a specific wavelength reflected by the cholesteric liquid crystal even when observed at various angles. That is to say, the cholesteric photonic crystal film manufactured according to the present disclosure can display a specific color independently of the viewing angles.

Test Example

1. SEM Analysis

Figures 6A, 6B, 6C:
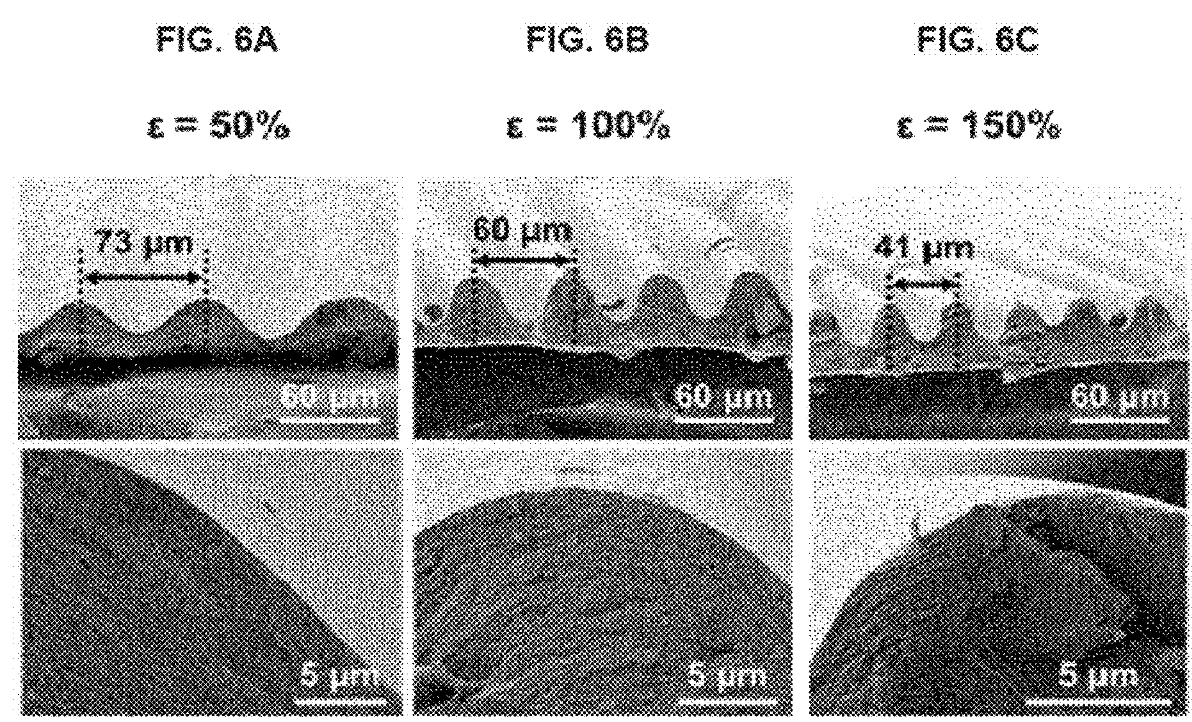
FIGS. 6A to 6C show the cross-sectional SEM images of cholesteric liquid crystal films manufactured in Example ((FIG. 6A) 50% strain, (FIG. 6B) 100% strain, (FIG. 6C) 150% strain).

The SEM images of the cholesteric liquid crystal films prepared in the example were analyzed. The SEM analysis was conducted using Supra 40 VP (Zeiss Co., Germany), and the result is shown in FIGS. 6A to 6C. FIGS. 6A to 6C show the cross-sectional SEM images of the cholesteric liquid crystal films manufactured in Example ((FIG. 6A) 50% strain, (FIG. 6B) 100% strain, (FIG. 6C) 150% strain).

From FIGS. 6A to 6C, the width of the peaks or valleys of the curved structure depending on strain can be identified. In addition, it can be seen that the cholesteric liquid crystal monomers were uniformly shear-coated on the micro-wrinkle-structured substrate.

2. Polarizing Optical Microscopic Analysis

Figure 7:
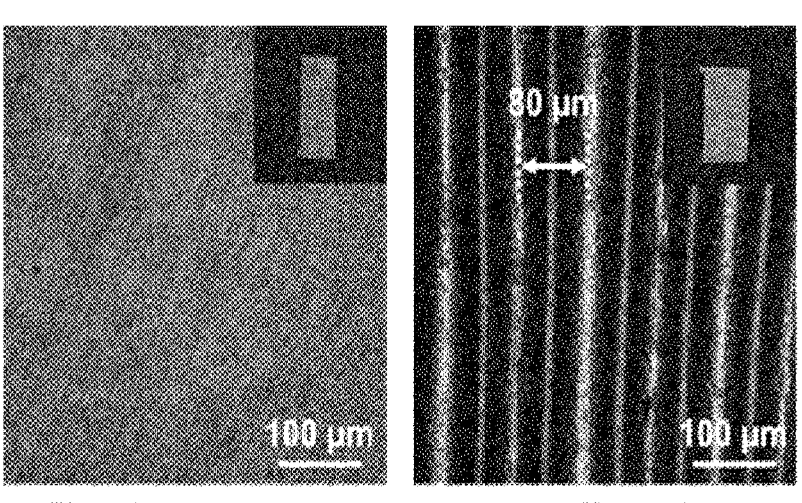
FIG. 7 shows the polarizing optical microscopic images of cholesteric liquid crystal monomers coated on a glass substrate and a micro-wrinkle-structured substrate manufactured with a strain of 100%.

The polarizing optical microscopic images of a conventional glass substrate and the cholesteric liquid crystal film prepared in the example were analyzed. FIG. 7 shows the polarizing optical microscopic images of cholesteric liquid crystal monomers coated on a glass substrate and the micro-wrinkle-structured substrate manufactured with a strain of 100%.

Referring to FIG. 7, it can be seen that the cholesteric liquid crystal film manufactured according to the present disclosure can display a color of a specific wavelength.

What is claimed is:

1. A method for manufacturing a cholesteric liquid crystal film, the method comprising:

preparing an elastic polymer substrate by impregnating, on one or both sides of a first polymer film, a second polymer having a modulus different from that of the first polymer;

preparing a micro-wrinkle-structured substrate by stretching the elastic polymer substrate in one direction and removing the stretching force; and preparing a micro-wrinkle-structured cholesteric liquid crystal film by transferring a cholesteric liquid crystal monomer mixture onto one side of the micro-wrinkle-structured substrate.

2. The method according to claim 1, wherein the preparing of the elastic polymer substrate comprises:

preparing a mixture solution by mixing the second polymer and a curing agent in an organic solvent, and infiltrating the second polymer into both sides of the first polymer film by impregnating the first polymer film in the mixture solution.

3. The method according to claim 1, wherein each of the first and second polymers comprises one or more selected from the group consisting of a silicone resin, a urethane resin, an isoprene resin, a fluorine resin, styrene-butadiene rubber, chloroprene rubber, an acrylonitrile copolymer and acrylate rubber.

4. The method according to claim 1, wherein the modulus of the first polymer is in the range of 0.5-0.7 MPa on average, and the modulus of the second polymer is in the range of 1.5-3.0 MPa on average.

5. The method according to claim 1, wherein the preparing of the micro-wrinkle-structured substrate comprises:

a process of stretching the elastic polymer substrate at 20-40° C. in one direction with a strain of 50-200% on average;

a process of thermally curing the stretched elastic polymer substrate at 70-150° C. on average; and a process of forming micro-wrinkles on the elastic polymer substrate by removing the stretching force from the thermally cured polymer substrate.

6. The method according to claim 5, wherein, in the process of thermally curing, an interpenetrating polymer network (IPN) structure in which the second polymer is bound to the contact surface of the first polymer film is formed.

7. The method according to claim 1, wherein the preparing of the micro-wrinkle-structured cholesteric liquid crystal film comprises:

a process of coating a cholesteric liquid crystal monomer mixture comprising first and second nematic liquid crystal monomers with different phase transition temperatures and a chiral monomer on the micro-wrinkle-structured substrate; and a process of preparing a cholesteric liquid crystal film by conducting photocrosslinking reaction of the liquid crystal monomer mixture.

8. The method according to claim 6, wherein the first and second nematic liquid crystal monomers and the chiral monomer are mixed at a weight ratio of 9-7:1-3.

9. The method according to claim 6, wherein the first and second nematic liquid crystal monomers have phase transition temperatures of 20-80° C.

10. The method according to claim 6, wherein each of the first and second nematic liquid crystal monomers independently comprises a rod-shaped core having a structure of any of Chemical Formulas 1-20, wherein each of A and B independently comprises an alkyl group with two or more carbon atoms and a methacrylate or acrylate group:

[Chemical Formula 1]

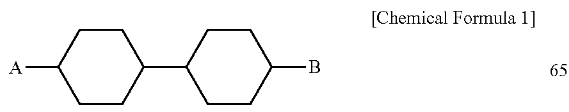

-continued

[Chemical Formula 2]

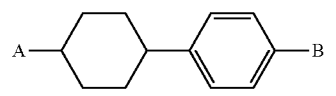

[Chemical Formula 3]

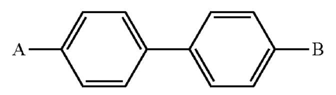

[Chemical Formula 4]

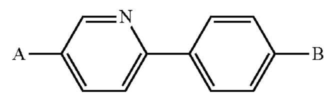

[Chemical Formula 5]

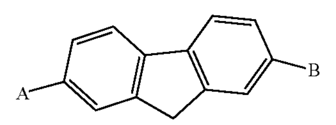

[Chemical Formula 6]

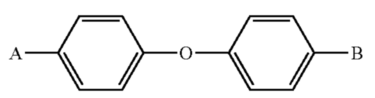

[Chemical Formula 7]

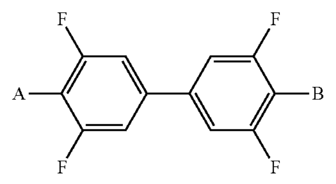

[Chemical Formula 8]

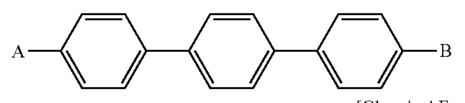

[Chemical Formula 9]

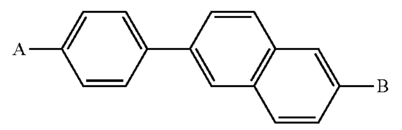

[Chemical Formula 10]

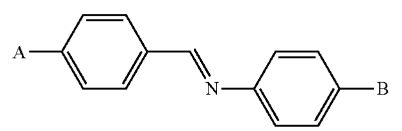

[Chemical Formula 11]

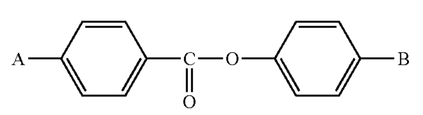

[Chemical Formula 12]

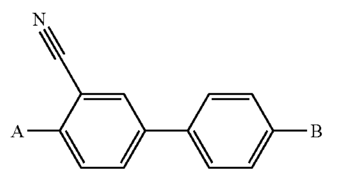

[Chemical Formula 13]

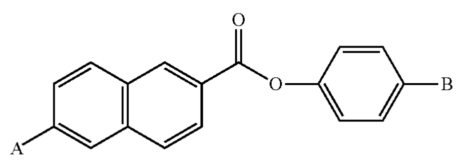

-continued

[Chemical Formula 14]

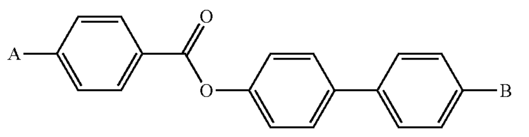

[Chemical Formula 15]

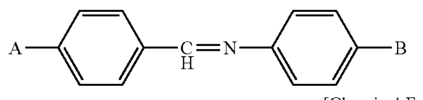

[Chemical Formula 16]

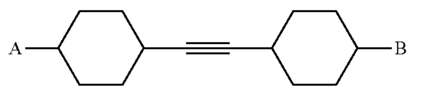

[Chemical Formula 17]

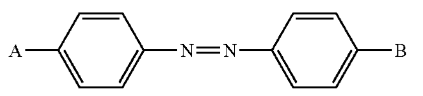

[Chemical Formula 18]

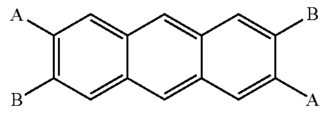

[Chemical Formula 19]

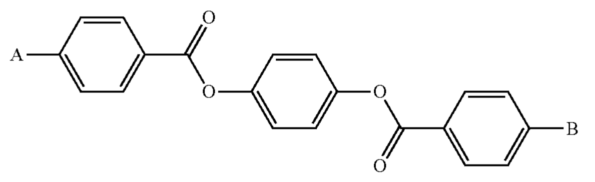

[Chemical Formula 20]

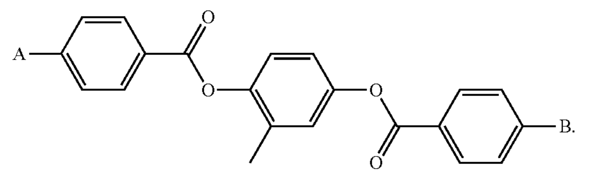

11. The method for manufacturing a cholesteric liquid crystal film according to claim 10, wherein, in Chemical Formulas 1-20, each of A and B is independently selected from the group consisting of structures of Chemical Formulas 21-26:

[Chemical Formula 21]

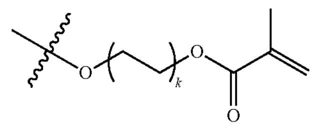

[Chemical Formula 22]

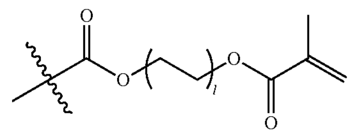

[Chemical Formula 23]

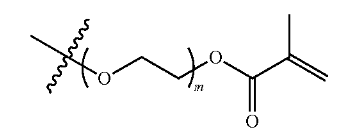

[Chemical Formula 24]

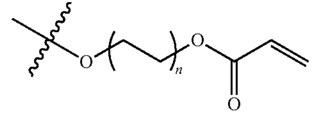

[Chemical Formula 25]

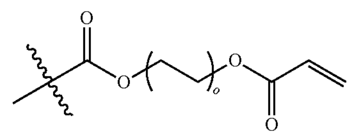

[Chemical Formula 26]

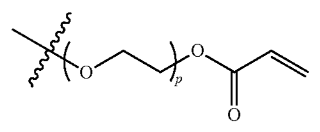

wherein each of k, l, m, n, o and p is independently an integer of 1-20.

12. The method according to claim 1, which further comprises separating the micro-wrinkle-structured cholesteric liquid crystal film from the micro-wrinkle-structured substrate.

* * * * *